US011947690B2

(12) United States Patent
Jiang et al.

(10) Patent No.: US 11,947,690 B2
(45) Date of Patent: Apr. 2, 2024

(54) INFORMATION PROCESSING DEVICE, INFORMATION PROCESSING METHOD, AND COMPUTER PROGRAM PRODUCT

(71) Applicant: KABUSHIKI KAISHA TOSHIBA, Tokyo (JP)

(72) Inventors: Dan Jiang, Tokyo (JP); Takeshi Kawabata, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 471 days.

(21) Appl. No.: 17/184,959

(22) Filed: Feb. 25, 2021

(65) Prior Publication Data

US 2022/0092199 A1    Mar. 24, 2022

(30) Foreign Application Priority Data

Sep. 18, 2020    (JP) ................. 2020-157718

(51) Int. Cl.
  *G06F 21/00*    (2013.01)
  *G06F 8/65*    (2018.01)
  *G06F 21/62*    (2013.01)

(52) U.S. Cl.
  CPC ............ *G06F 21/6209* (2013.01); *G06F 8/65* (2013.01)

(58) Field of Classification Search
  CPC ...... G06F 21/6209; G06F 8/65; G06F 21/572; G06F 21/565
  See application file for complete search history.

(56) References Cited

U.S. PATENT DOCUMENTS

2006/0150256 A1\* 7/2006 Fanton ................ H04L 9/32
                                                              726/27
2015/0193618 A1\* 7/2015 Takano ................ G06F 8/65
                                                              726/23
(Continued)

FOREIGN PATENT DOCUMENTS

EP    3 748 528 A1    12/2020
JP    2017-33248 A    2/2017
(Continued)

OTHER PUBLICATIONS

Hayaki et al., "Proposal of proof of trust by tampering detection system for IOT devices," The Institute of Electronics Information and Communication Engineers 2020 Symposium on Cryptography and Information Security, 15 pages (Kochi, Japan, Jan. 28-31, 2020).

(Continued)

*Primary Examiner* — Ghazal B Shehni
(74) *Attorney, Agent, or Firm* — Finnegan, Henderson, Farabow, Garrett & Dunner, LLP

(57) ABSTRACT

An information processing device according to an embodiment includes a memory and one or more hardware processors. The memory includes a flag table storage area to store a flag table in which file information for individually identifying one or more pieces of software is associated with a flag used for execution control of a corresponding one of the pieces of software. When rewrite of first software is detected, the hardware processors: extract first file information being the file information corresponding to the first software; change a first flag corresponding to the first file information to a first value indicating that verification of integrity of the first software is required; change a file of the first software in an authorized manner; and change the first (Continued)

value, which has been changed, to a second value indicating permission of execution of the first software.

12 Claims, 10 Drawing Sheets

(56) References Cited

U.S. PATENT DOCUMENTS

| | | | |
|---|---|---|---|
| 2019/0102547 A1* | 4/2019 | Aktas | ................... G06F 21/56 |
| 2020/0089914 A1 | 3/2020 | Komatsubara et al. | |
| 2021/0049275 A1* | 2/2021 | Higashiyama | .......... H04L 63/20 |

FOREIGN PATENT DOCUMENTS

| | | |
|---|---|---|
| JP | 2018-195329 A | 12/2018 |
| JP | 2019-185575 A | 10/2019 |
| JP | 2020-46829 A | 3/2020 |
| WO | WO 2019/151013 A1 | 8/2019 |

OTHER PUBLICATIONS

Kobayashi et al., "SAFES: Sand-boxed Architecture for Frequent Environment Self-Measurement," ACM SysTEX'18, pp. 37-41 (Toronto, ON, Canada, Oct. 15, 2018).

* cited by examiner

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2020-157718, filed on Sep. 18, 2020; the entire contents of which are incorporated herein by reference.

FIELD

Embodiments described herein relate generally to an information processing device, an information processing method, and a computer program product.

BACKGROUND

Embedded devices for automobiles and robots have been digitalized. In addition, the embedded devices communicate with a network to achieve various advanced functions, such as remote monitoring, remote control, information sharing, and automatic driving.

However, connection of the embedded devices to the network increases possibility that embedded devices will hit by cyber attacks over the network.

When software running on an embedded device is tampered by an attacker, the embedded device may unexpectedly operate operation and cause a fatal accident. Therefore, it is important to cause the embedded device execute only authorized software. Whitelisting execution control technologies have been studied to verify the integrity of software at the beginning of execution of the software and permit execution thereof when the software has an intended status.

Although it depends on the verification method performed immediately before the execution of software, a longer processing time for generally used hash calculation, message authentication code (MAC) calculation, or the like is required for larger software sized.

While the software tends to increase in size to achieve high functionality for the embedded devices, real-time execution of the software with reduced delay has been also required. Therefore, there is a need to suppress delays in execution of software while maintaining the integrity of the software.

DETAILED DESCRIPTION

An information processing device according to an embodiment includes a memory and one or more hardware processors. The memory includes a flag table storage area to store a flag table in which file information for individually identifying one or more pieces of software is associated with a flag used for execution control of a corresponding one of the pieces of software. The one or more hardware processors are connected to the memory and configured to function as a rewrite processing unit and a software authorized change unit. The rewrite processing unit is configured to, when rewrite of first software being one of the pieces of software is detected, extract first file information being the file information corresponding to the first software, and change a first flag corresponding to the first file information in the flag table to a first value indicating that verification of integrity of the first software for which rewrite is detected is required, based on the extracted first file information. The software authorized change unit is configured to change a file of the first software in an authorized manner. When the change of a file of the first software in an authorized manner is performed, the software authorized change unit changes the first value, which has been changed by the rewrite processing unit, to a second value indicating permission of execution of the first software.

Hereinafter, embodiments for carrying out the disclosure will be described.

First Embodiment

Outline and Configuration of First Embodiment

Figure 1:
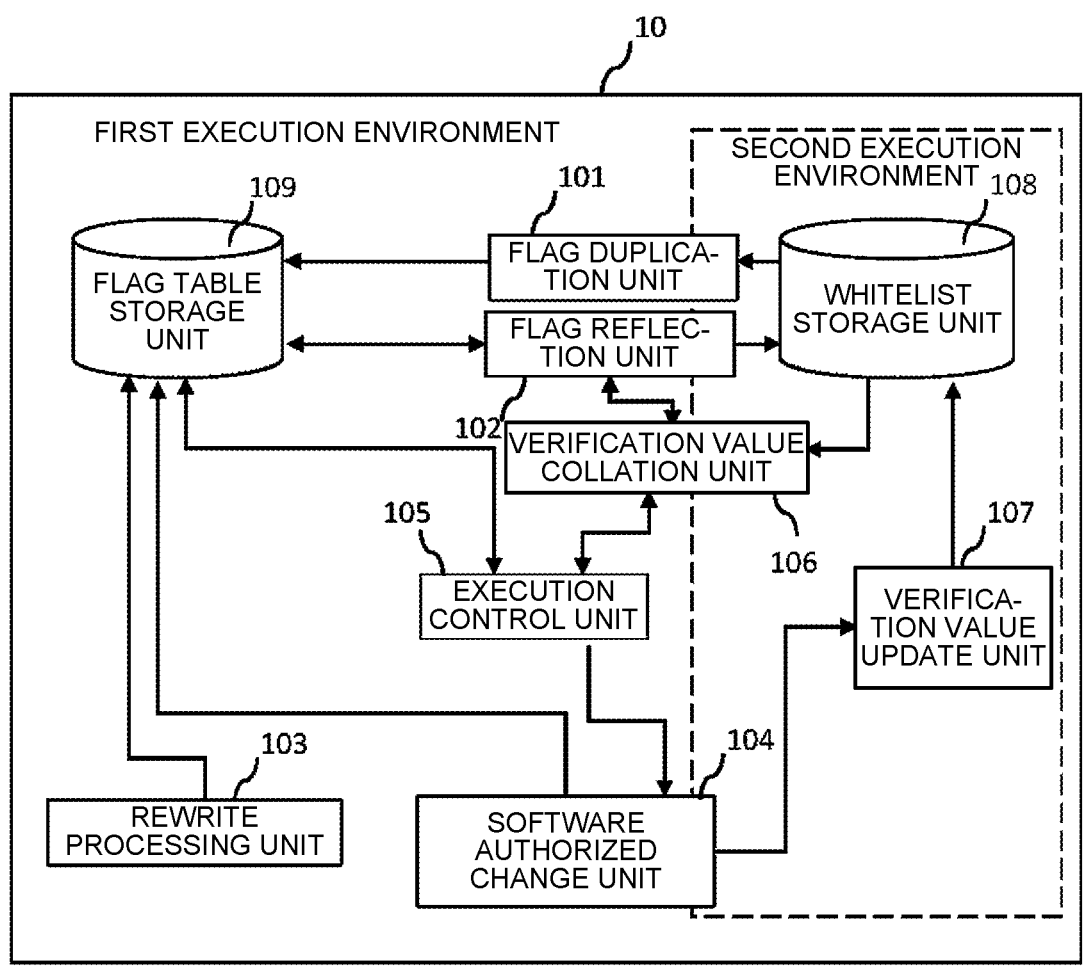
FIG. 1 is a block diagram illustrating an example of a functional configuration of an information processing device 10 according to a first embodiment.

A first embodiment will be described with reference to FIGS. 1 to 10. FIG. 1 is a block diagram illustrating an example of a functional configuration of an information processing device 10 according to the first embodiment. As illustrated in FIG. 1, the information processing device 10 includes a flag duplication unit 101, a flag reflection unit 102, a rewrite processing unit 103, a software authorized change unit 104, an execution control unit 105, a verification value collation unit 106, a verification value update unit 107, a whitelist storage unit (a whitelist storage area) 108, and a flag table storage unit (a flag table storage area) 109.

The information processing device 10 performs whitelisting execution control on software in various systems designed for various purposes. When the beginning of execution of software is detected, the information processing device 10 refers to a flag (an example of execution control information) associated with the software to determine whether to permit the execution of the software or whether to verify the integrity of the software, as execution control.

Furthermore, when a file of software, which is stored in a storage 76 (FIG. 10) and whose execution is permitted in advance, is rewritten, the information processing device 10 operates a flag associated with the software to verify the integrity of the software at the beginning of execution of the software. Furthermore, when software permitted to be executed in advance is changed (recovered or updated) in an authorized manner, the information processing device 10 rewrites a flag so as to have a value indicating that the integrity of the software needs to be verified once, and then the flag is operated again, and permits execution of the software at the beginning of the execution of the software.

Next, a first execution environment and a second execution environment applied to the information processing device 10 will be described. The first execution environment is a non-secure execution environment, and the second execution environment is a secure execution environment.

The first/second execution environments are virtualized on the same hardware. The first execution environment corresponds to a normal execution environment of the information processing device 10. The second execution environment is an execution environment having stronger security than the first execution environment.

In the first execution environment, OS such as Linux (registered trademark) is used, for example. Connection to an external network provides various functions such as remote monitoring. An attacker can access to the first execution environment from outside the information processing device 10 over the network.

On the other hand, the second execution environment is created on the same hardware by virtualization technology, and access from the first execution environment is restricted by hardware access control. The OS used in the second execution environment includes, for example, TOPPERS that is a real-time OS. A small-scale, low-vulnerable OS is used to maintain the reliability of the second execution environment. In the present embodiment, it is assumed that the second execution environment does not directly communicate with the external network.

The technology for achieving the virtualization of the first execution environment and second execution environment, which are described above, uses the Trust Zone (registered trademark) of ARM Limited, for example.

Next, the functional units of the information processing device 10 will be described.

As illustrated in FIG. 1, the flag table storage unit 109, the rewrite processing unit 103, and the execution control unit 105 are arranged in the first execution environment. The verification value update unit 107 and the whitelist storage unit 108 are arranged in the second execution environment. In the flag duplication unit 101, the flag reflection unit 102, the software authorized change unit 104, and the verification value collation unit 106, processing for both environments is partially arranged, for execution of the entire processing across the environments. All processing needs to operate in a privileged mode of each execution environment and needs to be incorporated into an OS kernel or application that operates in the privileged mode.

The whitelist storage unit (whitelist storage area) 108 stores a whitelist L1 in the second execution environment. The whitelist L1 represents a list that is created in advance by a system developer or operator and in which file information, verification values, and execution control information of software are associated with each other, and the software is permitted to be executed in the information processing device 10.

The file information (also referred to as identification information) is information for identifying a file of the software and includes, for example, a file path indicating a path to access the file. In the following description, while the file information of the software will be described as the file path, other information that can identify the file of the software, such as an inode number or device number, may be used.

Furthermore, the verification value (sometimes referred to as verification information) is a value for verifying the integrity (correctness) of the software. The verification value is, for example, a hash value. Hereinafter, the verification value is described as being the hash value. Note that a message authentication code (MAC) may be used to verify the integrity of the software.

The execution control information is information used for determining the execution control of the software at the beginning of execution of the software.

In the following description, the execution control information is described as using a flag (also referred to as an execution control flag), but another structural form that is usable for determination of the execution control of the software may be used.

Figure 2:
FIG. 2 is an example of a whitelist L1.

FIG. 2 is an example of the whitelist L1. In FIG. 2, for example, a file path "AAAAA", a hash value "XXXXX", and a flag "0" are associated with each other. This indicates that software having the file path "AAAAA" is given the hash value "XXXXX" and the flag "0 (deemed permission)".

In the example of the whitelist L1 illustrated in FIG. 2, the flag can take one of two values of "0 (deemed permission)" and "2 (deemed rejection)".

The flag "0 (deemed permission)" (also referred to as a second value) is a value of a flag indicating, when the beginning of the execution of software indicated by a file path associated with the value of this flag is detected (at the beginning of the execution), the permission of the execution of the software without verifying the integrity of the software.

The flag "2 (deemed rejection)" (also referred to as a third value) is a value of a flag indicating, when the beginning of the execution of software indicated by a file path associated with the value of this flag is detected, no execution of the software, that is, rejection of the execution of the software.

The whitelist storage unit 108 stores the whitelist L1 in the second execution environment that is a safe execution environment, in order to prevent tampering by an attacker while the information processing device 10 is operating.

Specifically, when the information processing device 10 is operating, the whitelist storage unit (whitelist storage area) 108 is allocated in a memory area (part of random access memory (RAM) 73) for the second execution environment to store the whitelist L1. When the information processing device 10 is not operated, the whitelist L1 is stored in a specified area of the storage 76 of the information processing device 10.

The flag table storage unit (flag table storage area) 109 is allocated in an OS kernel memory area (part of the RAM 73) for the first execution environment to store a flag table L2. The flag table L2 in the initial state is obtained by duplicating the file paths and the flags from the whitelist L1 by the flag duplication unit 101.

In addition to the two values of "0 (deemed permission)" and "2 (deemed rejection)", the flag table L2 can take a value of "1 (to be verified)", as described later. These values have the effect of suppressing a delay during software execution. When the execution control of software is performed only by using the whitelist L1, without using the flag table L2, the execution control unit 105 arranged in the second execution environment refers to a flag in the whitelist L1 located in the first execution environment to perform the execution control of the software. In this case, an overhead occurs to switch the execution environments every time a flag is referenced to, which causes a delay in software execution. Therefore, the flag table storage unit 109 is provided in the first execution environment.

The flag "1 (to be verified)" (also referred to as the first value) is a value of a flag indicating that, when the beginning of the execution of software indicated by a file path associated with the value of this flag is detected, verification of the integrity of the software is required.

Figure 3:
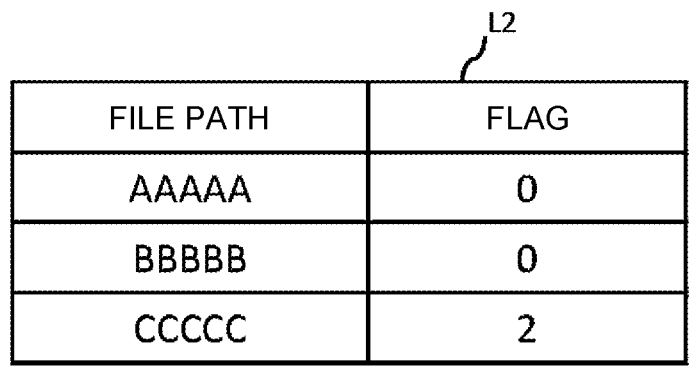
FIG. 3 is an example of a flag table L2.

FIG. 3 is an example of the flag table L2. As illustrated in FIG. 3, the contents of the flag table L2 are the file paths and corresponding flags duplicated from the whitelist L1 and is a subset of the whitelist L1.

In FIG. 3, for example, software having the file path "AAAAA" is given the flag "0 (deemed permission)".

The flag duplication unit 101 duplicates, as the flag table L2, the file paths and the corresponding flags from the whitelist L1 stored in the whitelist storage unit 108 arranged in the second execution environment, at the time of startup, and causes the flag table storage unit 109 arranged in the first execution environment to store the duplication thereof.

The flag reflection unit 102 operates such that information of the flag table L2 stored in the flag table storage unit 109 in the first execution environment is reflected in the whitelist L1 stored in the whitelist storage unit 108 in the second execution environment.

Cooperation between the flag duplication unit 101 and the flag reflection unit 102, which are described above, achieves synchronization between the information of the whitelist L1 and flag table L2.

Upon detection of rewrite (change) of a file of software stored in the storage 76 or the like of the information processing device 10 (without distinguishing between unauthorized change and authorized change), the rewrite processing unit 103 extracts a file path of the software and changes a flag associated with the file path of the software in the flag table L2 to "1 (to be verified)".

As an example of a method for detecting the rewriting of software by the rewrite processing unit 103, a method is considered, in which, when a writing process for a file of software (e.g., a process relating to write of Linux (registered trademark) kernel) is called, the calling is detected as rewriting of the software.

The software authorized change unit 104 performs a process of authorized rewriting (changing) of the file of the software, that is, a process of rewriting (changing) the file of the software in an authorized manner. In this case, even an authorized rewrite, the rewrite processing unit 103 has changed the flag corresponding to the file path of the software to be rewritten in the flag table L2 to "1 (to be verified)", thus the software authorized change unit 104 changes the flag to "0 (deemed permission)".

The authorized change of software represents a rewriting process for software intended for by a system administrator, and the authorized change can be considered as update for addition of a software function or application of security batches to software and recovery from software failure.

Note that during the operation of the software authorized change unit 104, in order to prevent unauthorized rewriting, an interrupt during the operation of the software authorized change unit 104 is prohibited.

When the beginning of execution of software is detected (at the beginning of execution), the execution control unit 105 controls the execution of the software, on the basis of a flag associated with the file path of the software in the flag table L2.

For an example, when the information processing device 10 is to start execution of software, the execution control unit 105 extracts the file path of the software and checks a flag corresponding to the file path of the software in the flag table L2.

In the flag table L2, when the flag corresponding to the file path of the software as the target of execution control is "0 (deemed permission)", the execution control unit 105 immediately permits execution of the software according to the flag.

Furthermore, in the flag table L2, when no flag corresponding to the file path of the software as the target of execution control is found or when the flag of the software is "2 (deemed rejection)", the execution control unit 105 rejects the execution of the software.

Furthermore, in the flag table L2, when the flag corresponding to the file path of the software as the target of execution control has a value "1 (to be verified)", the execution control unit 105 verifies the integrity of the software, in cooperation with the verification value collation unit 106.

As an example, the execution control unit 105 calculates a hash value from an executable file (held in the storage 76) of software as the target of execution control and outputs both of the file path of the software and the calculated hash value to the verification value collation unit 106. Then, the verification value collation unit 106 uses the file path of the software and the hash value to verify the integrity of the software in cooperation with the whitelist L1 held in the second execution environment.

The execution control unit 105 permits the execution of the software when the integrity is successfully verified and rejects the execution of the software when the verification of the integrity fails. Note that when the execution of the software is rejected, the rejection is considered as an error, and it is preferable to notify the system administrator of the error.

The verification value collation unit 106 acquires a file path of software as the target of integrity verification and a hash value calculated by the execution control unit 105, from the execution control unit 105, collates the hash value calculated by the execution control unit 105 with a hash value of the software in the whitelist L1, and verifies the integrity. Furthermore, the verification value collation unit 106 notifies the execution control unit 105 of a result of the verification.

Specifically, the verification value collation unit 106 determines whether the file path of the software as the target of integrity verification is in the whitelist L1, further collates a hash value associated with the file path of the software with the hash value calculated by the execution control unit 105 when the file path of the software is in the whitelist L1, and notifies the execution control unit 105 of a result of the verification, "successful verification", when both values match.

Furthermore, when the file path is not in the whitelist L1 or when the hash value in the whitelist L1, associated with the file path of the software, does not match the hash value calculated by the execution control unit 105, the execution control unit 105 is notified of a result of the verification, "failure in verification".

In the authorized change of software performed by the software authorized change unit 104, the verification value update unit 107 acquires the file path and a new hash value of software as the target of authorized change, from the software authorized change unit 104, and updates the hash value associated with the file path of the software in the whitelist L1.

Processing According to First Embodiment

Processing procedures of the information processing device 10 according to the present embodiment will be described with reference to FIGS. 4 to 9.

First, a processing procedure for duplicating, as the flag table L2, part of the whitelist L1 by the flag duplication unit 101 will be described.

Figure 4:
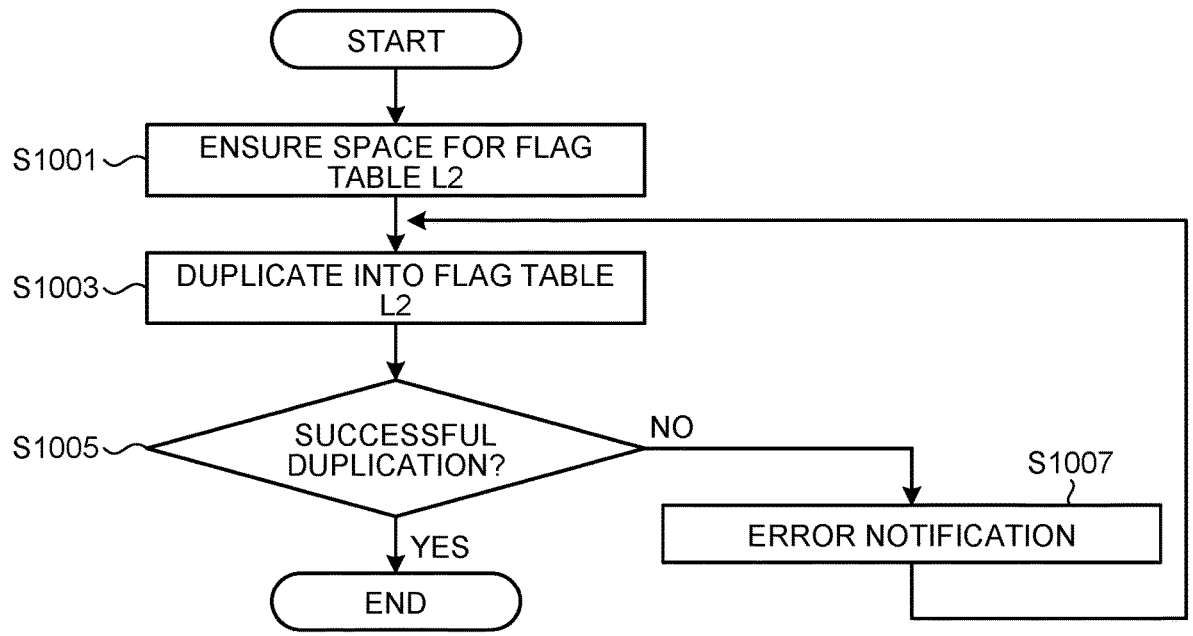
FIG. 4 is a flowchart illustrating an example of a processing procedure for duplicating necessary information from the whitelist L1 to the flag table L2.

FIG. 4 is a flowchart illustrating an example of a processing procedure for duplicating necessary information from the whitelist L1 to the flag table L2. The information processing device 10 being activated initializes the second execution environment first, and then initializes the first execution environment as soon as the OS or the like of the second execution environment is prepared. Then, a duplication process for the flag table L2 is started.

The flag table storage unit 109 ensures a space for storing the flag table L2 in the OS kernel memory area of the first execution environment (Step S1001). The flag table L2 is a subset of the whitelist L1, and the size of the whitelist L1 defines the size of the flag table L2.

Note that the size of the whitelist L1 may have a fixed value specified in advance by the system administrator or may have a variable value depending on the number of software lists to be protected.

Likewise, in Step S1001, after the preparation of the space for the flag table L2, the flag table storage unit 109 notifies the flag duplication unit 101 that the space for the flag table L2 has been prepared.

The flag duplication unit 101 acquires sets of file paths and flags in the whitelist L1 from the whitelist storage unit 108, outputs the sets of the file paths and the flags to the flag table storage unit 109, and thereby duplicates the sets of the file paths and the flags into the flag table L2 (Step S1003).

The flag duplication unit 101 refers to the flag table L2 and determines whether the duplication into the flag table L2 is successfully performed (Step S1005). When all the sets of the file paths and the hash values in the whitelist L1 are in the flag table L2, the flag duplication unit 101 determines that the duplication process is successfully performed (Step S1005: Yes) and finishes the process. In Step S1005, if one of the sets of the file paths and the hash values in the whitelist L1 is not in the flag table L2, the flag duplication unit 101 determines that the duplication process fails (Step S1005: No), gives an error notification to the system administrator (Step S1007), and proceeds to Step S1003. Then, the duplication process is performed again after a certain period of time.

Note that the error notification is merely a mechanism for making the system administrator aware of abnormality at an early stage and is not always necessary.

Furthermore, the flag table duplication process is performed in the early stage after the information processing device 10 is activated, but is not limited to this. For example, the process may be performed at timing different from the time of activation of the information processing device 10 or may be performed periodically.

Next, a processing procedure for rewriting a file of software in the storage will be described.

Figure 5:
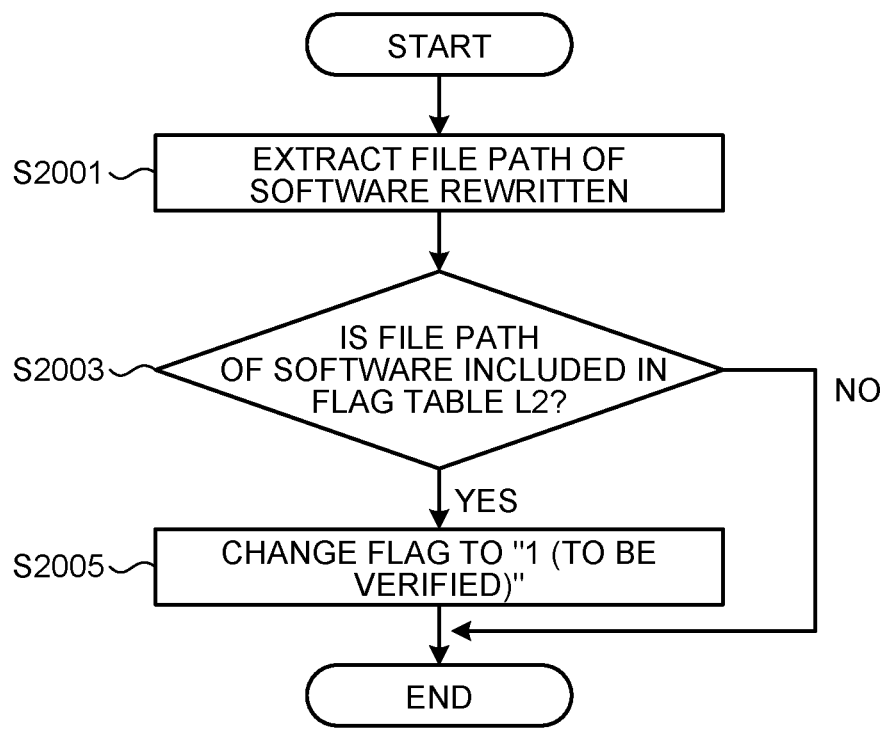
FIG. 5 is a flowchart illustrating an example of a processing procedure in rewriting a file of software.

FIG. 5 is a flowchart illustrating an example of a processing procedure in rewriting a file of software.

The rewrite processing unit 103 constantly monitors the movement of the system in the device during operation of the information processing device 10. Then, when a process of writing data to the storage 76 (FIG. 10) (e.g., a process relating to write of Linux (registered trademark) kernel) occurs, the rewrite processing unit 103 detects the occurrence of the rewrite and starts the process illustrated in FIG. 5.

The rewrite processing unit 103 extracts a file path of software rewritten (Step S2001). For example, when software having a file path "BBBBB" is rewritten, the rewrite processing unit 103 extracts the file path "BBBBB".

The rewrite processing unit 103 refers to the flag table L2 from the flag table storage unit 109 and determines whether the file path of the rewritten software is included in the flag table L2 (Step S2003).

When the file path of the software is included in the flag table L2 (Step S2003: Yes), the rewrite processing unit 103 changes the value of a flag corresponding to the file path of the software in the flag table L2 to "1 (to be verified)" (Step S2005) and finishes the process.

Note that when changing the value of the flag, the rewrite processing unit 103 does not need to check the value of the flag before changing.

Furthermore, when the file path of the software is not included in the flag table L2 in Step S2003 (Step S2003: No), the process is finished.

Next, a processing procedure in execution of software by the information processing device 10 will be described.

Figure 6:
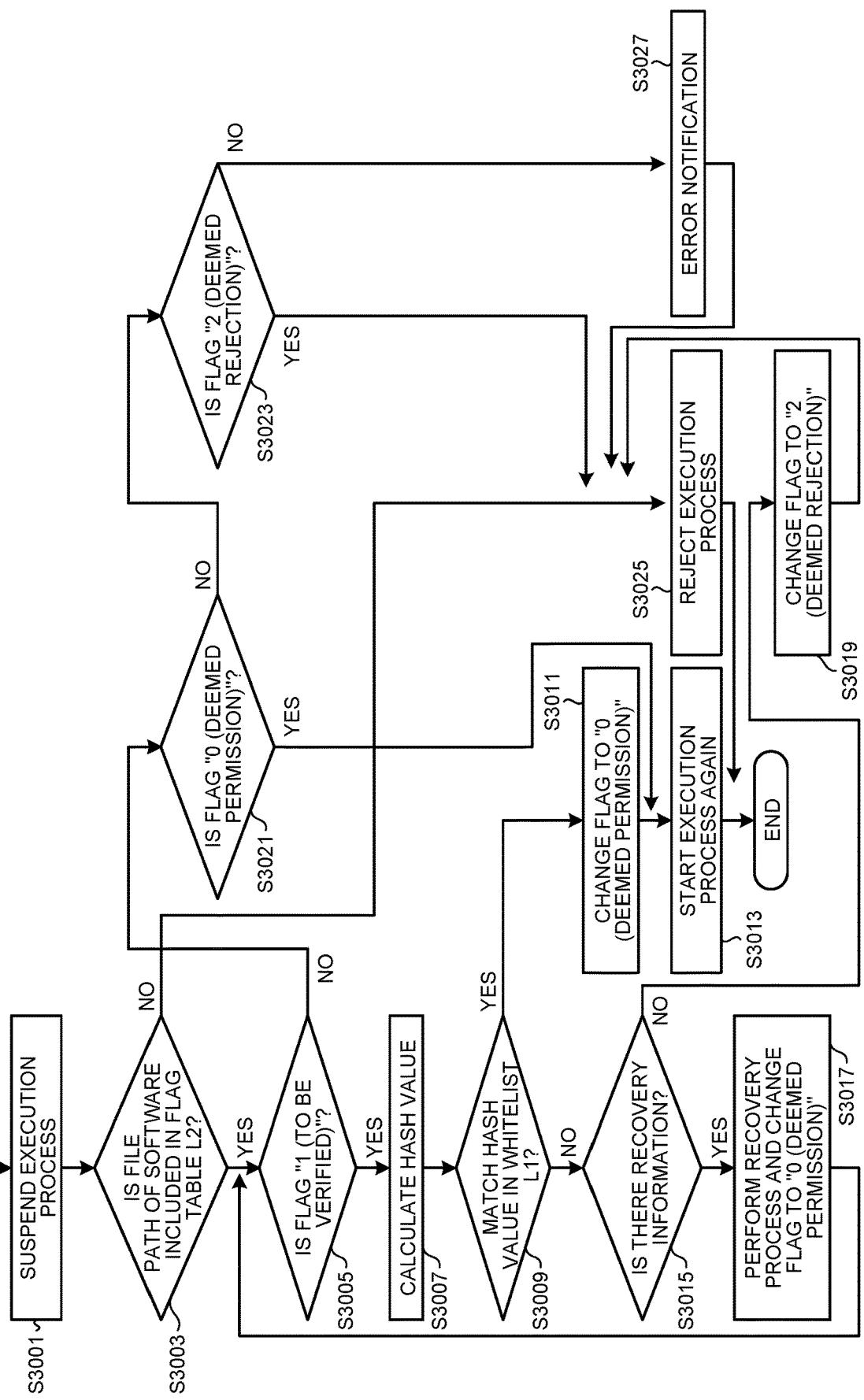
FIG. 6 is a flowchart illustrating an example of a processing procedure for execution control of software.

FIG. 6 is a flowchart illustrating an example of the processing procedure for execution control of software. The process illustrated in the flowchart of FIG. 6 is performed every time the beginning of software execution is detected. Note that software whose beginning of execution is detected and that becomes the target of execution control may be referred to as software as the target of execution control.

When the information processing device 10 is to start execution of the software, the kernel of the first execution environment starts processing (e.g., processing relating to execve of Linux (registered trademark)). In Step S3001 of FIG. 6, the kernel of the first execution environment suspends the execution process of the kernel before reading the executable file of the software to be executed. Then, the process proceeds to Step S3003 of FIG. 6. Note that a method for shift to a function (processing after Step S3003 of FIG. 6) during suspension of the execution process of the kernel can be achieved, for example, by using a security hook point of Linux (registered trademark) security module (LSM).

In Step S3003 of FIG. 6, the execution control unit 105 acquires first the file path of the software as the target of execution control, and refers to the flag table L2 to determine whether the file path of the software is included in the flag table L2.

When the file path of the software as the target of execution control is included in the flag table L2 (Step S3003: Yes), the execution control unit 105 determines whether the value of a flag associated with the file path indicates "1 (to be verified)" (Step S3005).

In Step S3005, when the value of the flag indicates "1 (to be verified)" (Step S3005: Yes), the execution control unit 105 acquires a file of the software from the file path of the software as the target of execution control and calculates a hash value (Step S3007). Furthermore, likewise, in Step S3007, the execution control unit 105 outputs the file path of the software as the target of execution control and the calculated hash value to the verification value collation unit 106.

The verification value collation unit 106 refers to the whitelist L1, compares the hash value of the software as the target of execution control calculated by the execution control unit 105 with a hash value of the software in the whitelist L1, and determines whether the hash values match (Step S3009).

In Step S3009, when the two verification values match (i.e., successful verification of the integrity) (Step S3009: Yes), the verification value collation unit 106 notifies the execution control unit 105 of a result of the verification "successful verification", and the execution control unit 105 changes the flag associated with the software as the target of execution control in the flag table L2 to "0 (deemed permission)" (Step S3011).

Then, the information processing device 10 returns to the execution process of the kernel so as to continue the execution process of the software as the target of execution control (Step S3013). Then, the process is finished.

In Step S3009 of FIG. 6, when the two verification values do not match (i.e., failure in verification of the integrity) (Step S3009: No), the process proceeds to Step S3015. In Step S3015, the verification value collation unit 106 notifies the execution control unit 105 of a result of the verification "failure in verification", and the execution control unit 105 checks whether recovery information for the software is in the read only memory (ROM) 72.

When the recovery information is in the ROM 72 (Step S3015: Yes), the execution control unit 105 outputs the file path of the software as the target of execution control to the software authorized change unit 104, and the software authorized change unit 104 performs recovery process for the software (Step S3017). Likewise, in Step S3017, the software authorized change unit 104 changes the flag associated with the software as the target of execution control in the flag table L2 to "0 (deemed permission)". Then, the process proceeds to Step S3005. The recovery process will be described in detail later.

In Step S3015, when there is no recovery information in the ROM 72 (Step S3015: No)", the process proceeds to Step S3019.

In Step S3019, the execution control unit 105 changes the flag associated with the software as the target of execution control in the flag table L2 to "2 (deemed rejection)". Then, in Step S3025, the execution control unit 105 rejects the execution of the software, and the information processing device 10 returns to the execution process of the kernel suspended and stops the execution process of the software.

In Step S3005, when the flag of the software as the target of execution control is not "1 (to be verified)" (Step S3005: No), the execution control unit 105 determines whether the value of the flag is "0 (deemed permission)" (Step S3021).

In Step S3021, when the value of the flag of the software as the target of execution control is "0 (deemed permission)" (Step S3021: Yes), the execution control unit 105 permits the execution of the software, and the information processing device 10 returns to the execution process of the kernel suspended and starts the execution process of the software as the target of execution control again (Step S3013).

In Step S3021, when the value of the flag of the software as the target of execution control is not "0 (deemed permission)" (Step S3021: No), the execution control unit 105 determines whether the flag is "2 (deemed rejection)" (Step S3023).

In Step S3023, when the flag of the software as the target of execution control is "2 (deemed rejection)" (Step S3023: Yes), the execution control unit 105 rejects the execution of the software, and the information processing device 10 returns to the execution process of the kernel suspended and stops the execution process of the software (Step S3025).

In Step S3023, when the flag of the software as the target of execution control is not "2 (deemed rejection)" (Step S3023: No), the execution control unit 105 considers the flag status as an error and notifies the system administrator of the error (Step S3027). Then, the execution control unit 105 rejects the execution of the software, and the information processing device 10 returns to the execution process of the kernel suspended and stops the execution process of the software (Step S3025).

In Step S3003, when the file path of the software as the target of execution control is not included in the flag table L2 (Step S3003: No), the execution control unit 105 rejects the execution of the software, and the information processing device 10 returns to the execution process of the kernel suspended and stops the execution process of the software (Step S3025).

Note that the software whose execution is rejected may be automatically or manually recovered at appropriate timing according to the importance of the software.

Figure 7:
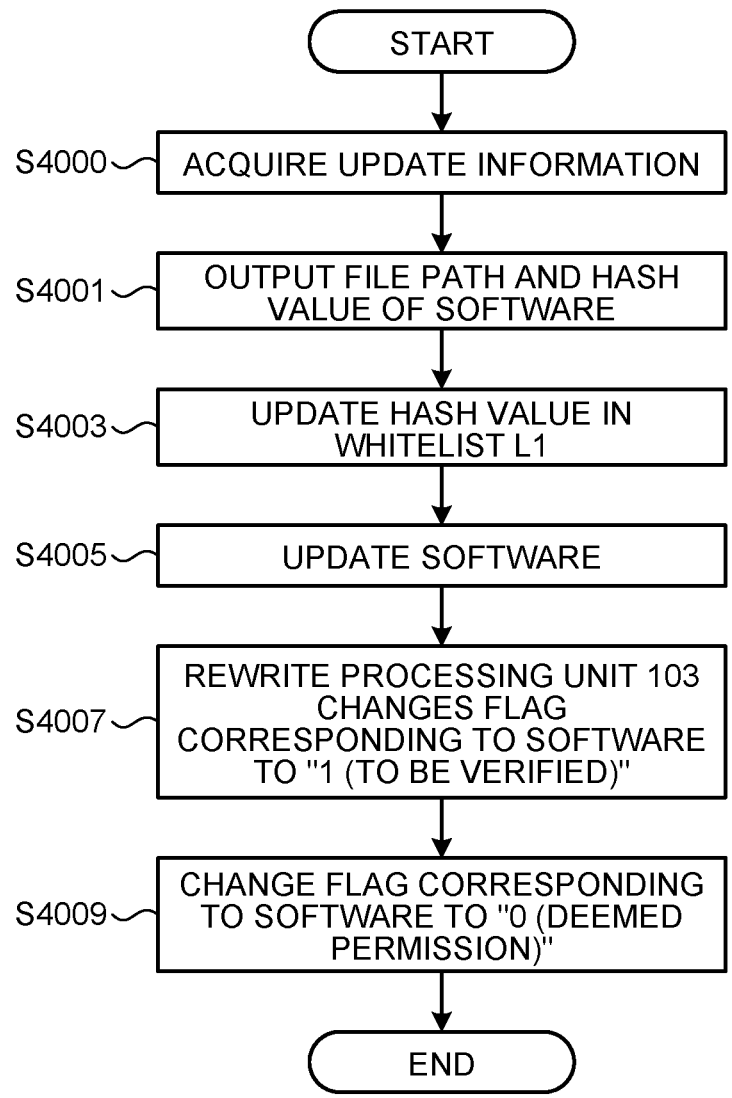
FIG. 7 is a flowchart illustrating an example of a processing procedure for update of software.

Next, a processing procedure in authorized change of software will be described. The authorized change of software includes updates and recovery. First, the update will be described. FIG. 7 is a flowchart illustrating an example of a processing procedure for update of software.

When a management unit configured to manage the version information of software inside the information processing device 10 determines that software needs to be updated, the information processing device 10 performs an update process for the software.

Figure 10:
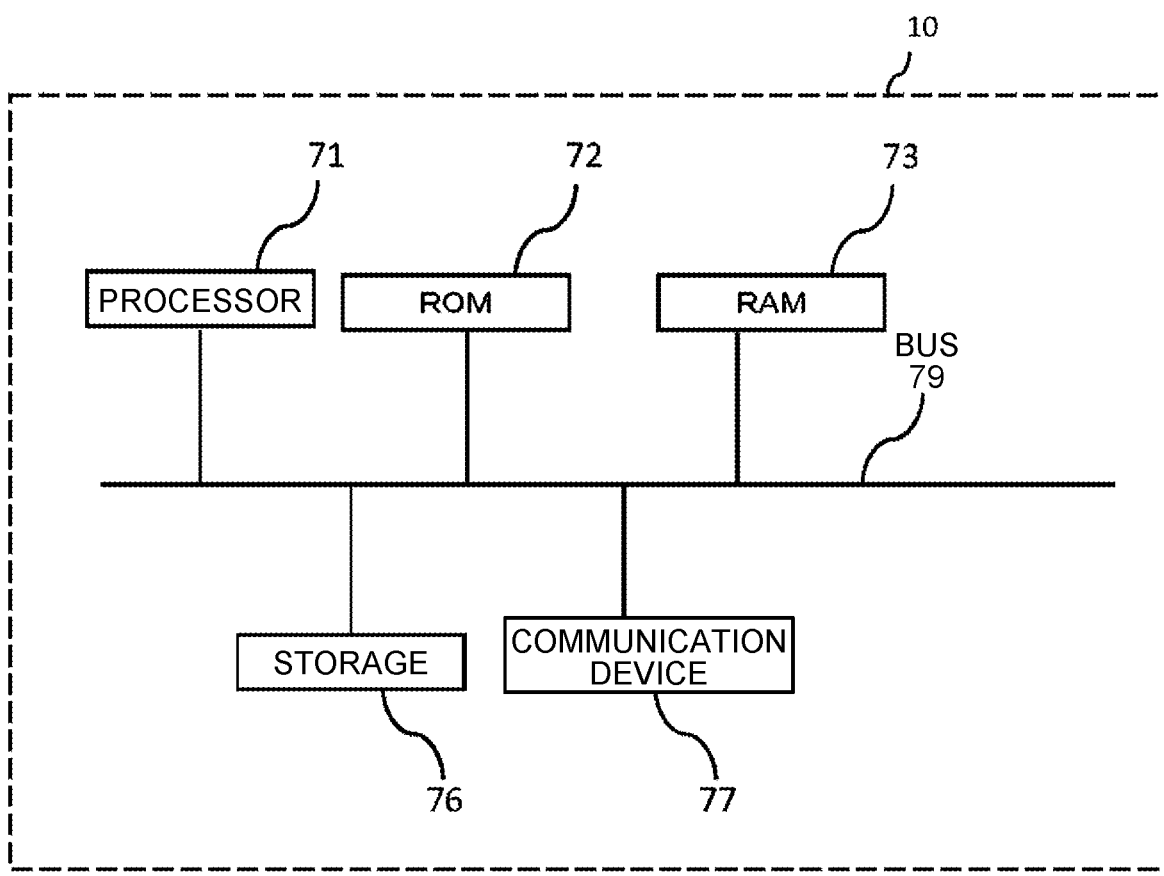
FIG. 10 is a block diagram illustrating an example of a hardware configuration of the information processing device 10 according to the first embodiment.

In Step S4000 of FIG. 7, the software authorized change unit 104 acquires update information. For example, the software authorized change unit 104 acquires the update information from outside by using a communication device 77 (FIG. 10). Note that it is assumed that the correctness of the update information has been ensured by other means.

Here, the update information contains a file path (file information) of software, an executable file (update file) of the software, and a hash value of the software.

In Step S4001 of FIG. 7, the software authorized change unit 104 outputs a file path and hash value of update target software to the verification value update unit 107.

The verification value update unit 107 updates a hash value associated with the update target software in the whitelist L1, from a hash value of an old file of the software to a hash value of the update file of the software (Step S4003).

Next, the software authorized change unit 104 updates the file of the update target software in the storage 76 by overwriting the old file with a new file (Step S4005).

As described above, the rewrite processing unit 103 has a function of changing the value of a flag associated with software in the flag table L2 to "1 (to be verified)", upon detection of rewriting a file of the software in the storage 76. Therefore, when the file to be updated is updated in Step S4005, the rewrite processing unit 103 changes a flag in the flag table L2, associated with the update target software, to "1 (to be verified)" (Step S4007).

Next, the software authorized change unit 104 detects that the flag of the update target software is "1 (to be verified)" and changes the flag to "0 (deemed permission)" for authorized change (update) of the software (Step S4009). Then, the process is finished.

Figure 8:
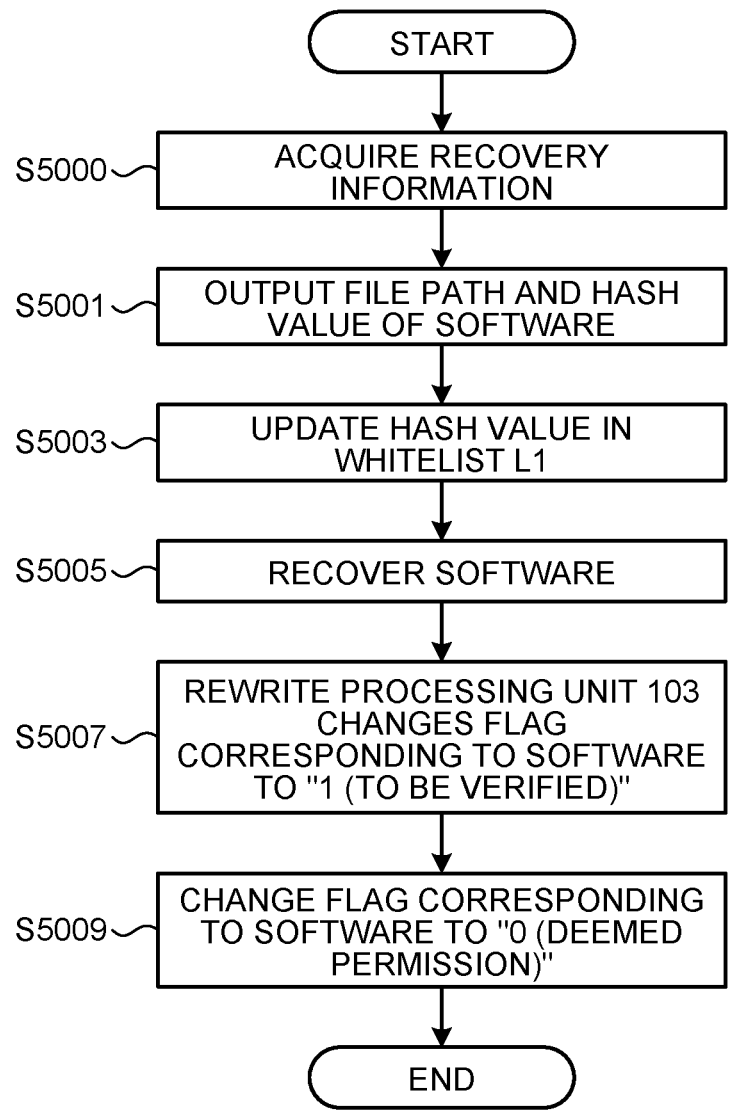
FIG. 8 is a flowchart illustrating an example of a processing procedure for recovery of software.

Next, the recovery process will be described. FIG. 8 is a flowchart illustrating an example of a processing procedure for recovery of software. As described in Step S3005 to Step S3017 of FIG. 6, when the verification of the integrity of software as the target of execution control fails but there is recovery information corresponding to the software, the software authorized change unit 104 performs a recovery process for the software.

In Step S5000 of FIG. 8, the software authorized change unit 104 acquires recovery information.

Note that the software authorized change unit 104 may acquire the recovery information from outside the information processing device 10 or from inside the information processing device 10 (ROM 72, etc.).

When the recovery information is acquired from inside the information processing device 10, it is necessary, for example, to save the recovery information in the ROM 72 or the like in advance.

The recovery information contains an old version of an authorized executable file (recovery file) of software and a hash value corresponding thereto.

In Step S5001 of FIG. 8, the software authorized change unit 104 outputs a file path of recovery target software and a hash value of the software to the verification value update unit 107.

The verification value update unit 107 updates a hash value associated with the recovery target software in the whitelist L1, to the hash value of the recovery file acquired from the software authorized change unit 104 (Step S5003).

Next, the software authorized change unit 104 recovers the recovery target software by overwriting the file of the recovery target software in the storage 76 with the recovery file in the recovery information (Step S5005).

When the executable file of the recovery target software is recovered in Step S5005, the rewrite processing unit 103 changes a flag in the flag table L2, associated with the recovery target software, to "1 (to be verified)" (Step S5007).

When it is detected that the flag associated with the software is "1 (to be verified)", the software authorized change unit 104 changes the flag to "0 (deemed permission)", for authorized change (recovery) of the software (Step S5009). Then, the duplication process is finished.

Next, a processing procedure for reflecting information of the flag table L2 in the whitelist L1 will be described.

Figure 9:
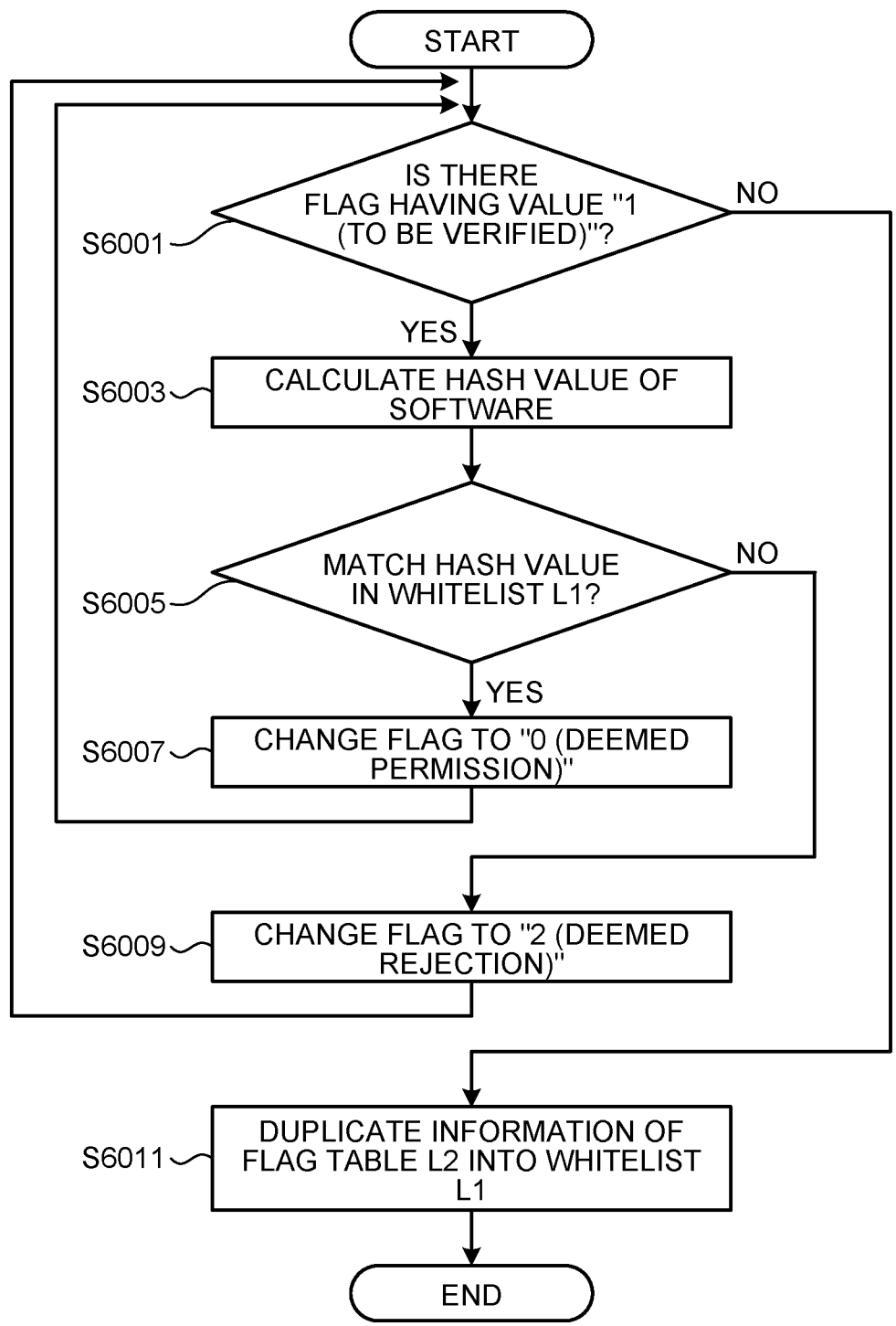
FIG. 9 is a flowchart illustrating an example of a processing procedure for reflecting information of the flag table L2 in the whitelist L1.

FIG. 9 is a flowchart illustrating an example of a processing procedure for reflecting information of the flag table L2 in the whitelist L1. In the following description, a reflection process is performed immediately before all services provided by executing software are finished and the information processing device 10 is stopped, but other timing of the reflection process may be set.

When all services provided by executing software are finished, the information processing device 10 closes a communication interface communicating with the outside and starts the process of reflecting the information of the flag table L2 in the whitelist L1.

In the reflection process, for execution control of software in the next operation of the information processing device 10, the flag "1 (to be verified)" is removed in reflection of the flags in the whitelist L1 before the information processing device 10 stops, in order to reduce processing of verifying the integrity of the software.

The flag reflection unit 102 refers to the flag table L2 first and checks the presence or absence of a flag having the value "1 (to be verified)" (Step S6001).

When the flag table L2 has the flag having the value "1 (to be verified)" (Step S6001: Yes), the information processing device 10 verifies the integrity of software corresponding to the flag in the processing of Step S6003 and Step S6005.

In Step S6003, the flag reflection unit 102 selects one flag from the flags having the value "1 (to be verified)" in the flag table L2, and calculates a hash value of software (software as the target of integrity verification) corresponding to the selected flag. Specifically, the hash value is calculated by acquiring a binary file of the software from the storage 76 on the basis of the file path of the software corresponding to the flag selected by the flag reflection unit 102. Likewise, in Step S6003, the flag reflection unit 102 outputs the file path of the software and the calculated hash value to the verification value collation unit 106.

The verification value collation unit 106 acquires the file path of the software as the target of integrity verification and the hash value corresponding to the software, from the flag reflection unit 102, refers to the whitelist L1, and determines whether a hash value associated with the software in the whitelist L1, matches the hash value calculated by the flag reflection unit 102 (Step S6005).

When the hash value associated with the software as the target of integrity verification in the whitelist L1, matches the hash value calculated by the flag reflection unit 102 (i.e., successful verification of the integrity) (Step S6005: Yes), the process proceeds to Step S6007.

In Step S6007, the verification value collation unit 106 notifies the flag reflection unit 102 of a result of the verification "successful verification", then the flag reflection unit 102 changes a flag in the flag table L2, associated with the software as the target of integrity verification, to "0 (deemed permission)", and proceeds to Step S6001.

In Step S6005 of FIG. 9, when the hash value associated with the software as the target of integrity verification in the whitelist L1, does not match the hash value calculated by the flag reflection unit 102 (i.e., failure in verification of the integrity) (Step S6005: No), the process proceeds to Step S6009.

In Step S6009, the verification value collation unit 106 notifies the flag reflection unit 102 of a result of the verification "failure in verification", and the flag reflection unit 102 changes the flag of the software as the target of integrity verification, in the flag table L2, to "2 (deemed rejection)" and proceeds to Step S6001.

When there is no flag having the value "1 (to be verified)" in the flag table L2 (Step S6001: No), the value of a flag corresponding to each piece of software in the flag table L2 is reflected in a flag corresponding to each piece of software in the whitelist L1 of the second execution environment (Step S6011).

Then, the information processing device 10 finishes the reflection process. Note that the whitelist L1 is held in the storage 76 while the information processing device 10 is stopped, and thus, the whitelist L1 is stored in the storage 76, before the information processing device 10 is stopped after the end of the reflection process illustrated in FIG. 9 is completed. Furthermore, when the information processing device 10 is activated next, the whitelist L1 that is subjected to the reflection process during the previous operation of the information processing device 10 before stopping is used. Note that when loading the whitelist L1 from the storage 76, other means to verify the correctness is required.

Effects of First Embodiment

As described above, the information processing device 10 according to the present embodiment performs whitelisting execution control on software against an expected attack on the software over a network. Upon execution of software, the information processing device 10 performs execution control on the software on the basis of a flag in the flag table L2.

When rewriting of software occurs after activation of the information processing device 10, a flag associated with the software in the flag table L2 is changed to "1 (to be verified)".

In a case software has a flag being "1 (to be verified)", when the software is executed, the information processing device 10 verifies the integrity of the software at that time.

Furthermore, when software having a flag whose value is "1 (to be verified)" is not executed before the information processing device 10 is ended (power is turned off), the integrity of the software is verified before information processing device 10 is turned off.

Furthermore, in authorized change of software, a flag associated with the software in the flag table L2 is changed from "1 (to be verified)" to "0 (deemed permission)", and authorized change of the software is distinguished from unauthorized rewrite of the software due to an attack over a network or the like.

In conventional art, software having been rewritten once is subjected to verification of the integrity upon execution without updating or recovering software, with limited effects to reduce a delay caused by verification in execution. However, the information processing device 10 according to the present embodiment is operable to perform execution control effectively reducing a delay in execution of software after authorized change of the software.

Furthermore, in the information processing device 10 according to the present embodiment, the integrity of software is verified at the timing of not immediately after activation of the information processing device 10 but upon unauthorized rewrite or before turning off the device after the end of provision of service. Therefore, overhead caused by verification of the integrity less affects the service provided by execution of the software.

Furthermore, arrangement of the whitelist L1 in the safe execution environment eliminates the need for periodical ensuring or checking of the integrity of the whitelist L1 upon operation of the information processing device 10.

Supplemental Description

The information processing device 10 according to the embodiment described above can be achieved, for example, by cooperation between hardware constituting a general computer and a program (software) executed by the computer. The software such as an OS image or the like on the storage 76 can be safely activated by means such as secure boot. The information processing device 10 according to the embodiment described above can be achieved by executing a program that has been stored in advance as firmware in a storage medium such as the storage 76.

FIG. 10 is a hardware configuration diagram of the information processing device 10. As illustrated in FIG. 10, the information processing device 10 includes a processor 71, the ROM 72, the RAM 73, the storage 76, the communication device 77, and a bus 79 configured to connect the respective units to each other, and the information processing device 10 can employ a hardware configuration as a general computer (computer system).

The processor 71 performs processing (control of each unit, processing of data, etc.) according to a program. The processor 71 performs various processing in cooperation with programs stored in the ROM 72, the storage 76, and the like, with a predetermined area of the RAM 73 as a work area.

The ROM 72 is a non-rewritable memory that stores an image of the current version of software to be executed on the device.

The RAM 73 is a memory such as a synchronous dynamic random access memory (SDRAM).

The RAM 73 stores data to be processed by the processor 71 and functions as a work area of the processor 71.

The storage 76 includes, for example, a hard disk drive (HDD), a solid state drive (SSD), or a flash memory. The storage 76 stores data and the like used by the operating system, application programs, and functional units.

The communication device 77 is an interface device for connection to a network. The communication device 77 communicates with an external device over the network according to control from the processor 71.

Furthermore, the programs executed by the information processing device according to the embodiment may be stored in a non-transitory computer-readable recording medium, such as a CD-ROM, CD-R, memory card, digital versatile disk (DVD), or flexible disk in an installable or executable format, and provided as a computer program product.

Furthermore, the programs executed by the information processing device 10 according to the embodiment may be stored on a computer connected to a network such as the Internet to be provided by being downloaded over the network. Furthermore, the programs executed by the information processing device 10 according to the embodiment may be provided or distributed over a network such as the Internet.

Note that the respective units of the information processing device 10 according to the embodiment described above may have a configuration in which all or some of the units are achieved by dedicated hardware such as an application specific integrated circuit (ASIC) or field-programmable gate array (FPGA).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a memory including a flag table storage area to store a flag table in which file information for individually identifying one or more pieces of software is associated with a flag on which one of multiple values is set, the multiple values including a first value and a second value, the first value representing that verification of integrity is required for a corresponding one of the one or more pieces of software, the second value representing permission of execution of a corresponding one of the one or more pieces of software without performing verification of integrity of the corresponding one of the one or more pieces of software; and
one or more hardware processors connected to the memory and configured to function as a rewrite processing unit and a software authorized change unit,
the rewrite processing unit being configured to, when rewrite of first software being one of the one or more pieces of software is detected, extract first file information being file information corresponding to the first software, and set the first value on a first flag corresponding to the first file information in the flag table, the software authorized change unit being configured to change a file of the first software in an authorized manner, wherein, when the change of a file of the first software in an authorized manner is performed, the software authorized change unit changes the first value, which has been-set on the first flag by the rewrite processing unit, to the second value.

2. The device according to claim 1, wherein the change of a file of the first software in the authorized manner performed by the software authorized change unit is a recovery process of recovering a file of the first software or an update process of updating a file of the first software.

3. The device according to claim 1, wherein
the flag table storage area is used in a first execution environment that is accessible from an outside of the information processing device,
the memory further includes a whitelist storage area used in a second execution environment that is inaccessible from the outside of the information processing device,
the whitelist storage area stores a whitelist in which the file information, the flag, and a verification value are associated with each other for each of the one or more pieces of software, the verification value being used for verification of integrity of a corresponding one of the one or more pieces of software, and
the one or more hardware processors are configured to duplicate the flag table from the whitelist and store the duplicated flag table in the flag table storage area.

4. The device according to claim 3, wherein the one or more hardware processors are configured to further function as a verification value update unit being configured to:
before performing the change in the file of the first software in the authorized manner by the software authorized change unit, acquire, from the software authorized change unit, the first file information and the verification value of a file for performing the authorized change of a file of the first software; and
update a verification value corresponding to the first file information in the whitelist to the verification value of the file for performing the authorized change acquired from the software authorized change unit.

5. The device according to claim 3, wherein
the multiple values used for the flag further includes a third value representing rejection of execution of a corresponding one of the one or more pieces of software, and
the one or more hardware processors are configured to:
when beginning of execution of the first software is detected, extract the first file information of the first software for which execution is detected;
determine that verification of integrity of the first software is required when the first flag corresponding to the extracted first file information has the first value;
permit execution of the first software when the first flag has the second value; and
reject execution of the first software when the first flag has the third value.

6. The device according to claim 5, wherein the one or more hardware processors are configured to:
when it is determined that verification of the integrity of the first software for which the execution is detected is required, acquire a file of the first software from the first file information of the first software for which the execution is detected;
calculate the verification value of the first software based on the acquired file; and
verify the integrity of the first software by comparing the verification value of the first software with the verification value corresponding to the first file information in the whitelist.

7. The device according to claim 6, wherein the one or more hardware processors are configured to:
determine that verification of the integrity of the first software is successfully performed when the verification value of the first software matches the verification value corresponding to the first file information in the whitelist;
determine that verification of the integrity of the first software fails when the verification values do not match;
change a value of the first flag to the second value in response to determining that verification of the integrity of the first software is successfully performed; and
perform a recovery process for the first software in response to determining that the verification of the integrity of the first software fails.

8. The device according to claim 7, wherein the one or more hardware processors are configured to set a value of the flag corresponding to the first file information in the whitelist to the value of the first flag in the flag table corresponding to the first file information.

9. The device according to claim 8, wherein the one or more hardware processors are configured to:
when the first flag in the flag table has the second value or the third value, reflect the value of the first flag in the flag table corresponding to the first file information in the whitelist;
when the first flag in the flag table has the first value, acquire the file of the first software from file information of the first software and calculate the verification value of the first software based on the acquired file; and
verify the integrity of the first software by comparing the verification value of the first software with the verification value corresponding to the first file information in the whitelist.

10. The device according to claim 9, wherein the one or more hardware processors are configured to:
determine that verification of the integrity of the first software is successfully performed when the verification value of the first software matches the verification value corresponding to the first file information in the whitelist;
determine that verification of the integrity of the first software is failed when the verification values do not match;
change the value of the first flag to the second value in response to determining that verification of the integrity of the first software is successfully performed;
change the value of the first flag to the third value in response to determining that the verification of the integrity of the first software fails; and
change the flag corresponding to the first software in the whitelist to the value of the changed first flag.

11. An information processing method implemented by a computer, the method comprising:
storing, to a memory, a flag table in which file information for individually identifying one or more pieces of software is associated with a flag on which one of multiple values is set, the multiple values including a first value and a second value, the first value representing that verification of integrity is required for a corresponding one of the one or more pieces of software, the second value representing permission of execution of a corresponding one of the one or more pieces of software without performing verification of integrity of the corresponding one of the one or more pieces of software;

when rewrite of first software being one of the one or more pieces of software is detected, performing a rewrite process of extracting first file information being file information corresponding to the first software and setting the first value on a first flag corresponding to the first file information in the flag table; and performing a software authorized change process of changing a file of the first software in an authorized manner, wherein the software authorized change process includes changing, when the changing a file of the first software in an authorized manner is performed, the first value, which has been set on the first flag by the rewrite processing, to the second value.

12. A computer program product comprising a non-transitory computer-readable recording medium on which an executable program is recorded, the program instructing a computer to:

store, to a memory, a flag table in which file information for individually identifying one or more pieces of software is associated with a flag on which one of multiple values is set, the multiple values including a first value and a second value, the first value representing that verification of integrity is required for a corresponding one of the one or more pieces of software, the second value representing permission of execution of a corresponding one of the one or more pieces of software without performing verification of integrity of the corresponding one of the one or more pieces of software;

when rewrite of first software being one of the one or more pieces of software is detected, perform a rewrite process of extracting first file information being file information corresponding to the first software and set the first value on a first flag corresponding to the first file information in the flag table; and perform a software authorized change process of changing a file of the first software in an authorized manner, wherein the software authorized change process includes changing, when the changing the file of the first software in an authorized manner is performed, the first value, which has been set on the first flag by the rewrite process, to the second value.

* * * * *

UNITED STATES PATENT AND TRADEMARK OFFICE
CERTIFICATE OF CORRECTION

PATENT NO. : 11,947,690 B2  
APPLICATION NO. : 17/184959  
DATED : April 2, 2024  
INVENTOR(S) : Dan Jiang et al.

Page 1 of 1

It is certified that error appears in the above-identified patent and that said Letters Patent is hereby corrected as shown below:

In the Claims

Claim 1, Column 15, Line 11, "been-set on" should read --been set on--.

Signed and Sealed this  
Twenty-fourth Day of December, 2024

Derrick Brent  
*Acting Director of the United States Patent and Trademark Office*